United States Patent [19]

Dickey et al.

[11] Patent Number: 4,776,613
[45] Date of Patent: Oct. 11, 1988

[54] PIPE JOINT WELD COLLAR AND METHOD OF INSTALLATION

[75] Inventors: David R. Dickey; James M. Price, both of Montgomery, Tex.

[73] Assignee: SLT North America, Inc., Conroe, Tex.

[21] Appl. No.: 29,450

[22] Filed: Mar. 23, 1987

[51] Int. Cl.$^4$ .............................................. F16L 11/12
[52] U.S. Cl. ........................................ 285/45; 285/55; 285/286; 285/293; 285/294; 29/458; 156/275.1
[58] Field of Search .................. 285/45, 286, 293, 373, 285/21, 294, 55; 29/458; 156/275.1

[56] References Cited

U.S. PATENT DOCUMENTS

| | | | |
|---|---|---|---|
| 3,297,819 | 1/1967 | Wetmore | 285/45 X |
| 3,628,814 | 12/1971 | Hallwood | 285/45 |
| 4,103,505 | 8/1978 | Howerton | 285/45 X |
| 4,172,607 | 10/1979 | Norton | 285/373 X |
| 4,629,216 | 12/1986 | Pedersen | 285/21 |

Primary Examiner—Dave W. Arola
Attorney, Agent, or Firm—Fulbright & Jaworski

[57] ABSTRACT

A pipe joint weld collar and method of installation is disclosed for an offshore oil/gas pipeline for covering contiguous end portions of a pair of pipes joined together by a metal weld. A coating of a high specific gravity material, such as concrete or the like is applied to the outer periphery of the pair of pipes to prevent floating of the pipes when oil or gas of less density than water is transported therethrough. The contiguous welded end portions of the pipes are void of concrete to form a peripheral recess or cutback providing access to the pipe end portions for welding. The collar comprises a plastic sheet spanning the recess and wrapped around the end portions of the coating for covering the recess. Clamp bands are placed around the wrapped sheet to prevent movement thereof on the concrete coatings and to hold the sheets in position for tack welding. The clamped and tack-welded sheet is permanently secured to end portions of the coating by a plastic weld securing one sheet end portion to the overlapped end sheet portion.

13 Claims, 2 Drawing Sheets

PIPE JOINT WELD COLLAR AND METHOD OF INSTALLATION

BACKGROUND OF THE INVENTION

1. Field of the Invention

This invention relates generally to offshore pipelines, and more specifically to a pipe joint weld collar covering for the contiguous end portions of a pair of pipes of an oil or gas pipeline joined together by a metal weld, and method of installation of the collar.

2. Description of the Prior Art

The high world-wide demand for energy in the form of oil and gas and the limited supply thereof has led to greatly increased offshore drilling activities in many countries. To transport the oil and gas from the undersea wells to refineries, a vast network of sea bed pipelines is required. The pipelines are formed from forty foot lengths of pipe which are joined together by welding on a lay barge and then fed onto the ocean floor.

Each forty foot length of pipe goes through many steps before it is transported to the lay barge. The manufactured pipe, preferably a seamless pipe of superior alloy material, is cleaned, then corrosion controlled coatings are applied to the outer pipe surface, and then a coating of high specific gravity material, such as concrete is applied to the outer surface of the pipe. The coating is applied to prevent the pipeline from floating to the surface when raw materials of a density less than water are transported therethrough. This coating may vary anywhere from one to six inches of thickness, depending on requirements. All of the aforementioned steps are performed on the entire outer surface of each forty foot length of pipe except for the last eight to twelve inches on each end thereof. These recessed end areas, referred to in the industry as cutback areas, are left free of coating material to provide access to the pipes so that one end of one pipe may be joined by welding to one end of an adjacent pipe on the barge. On the lay barge, the lengths of pipe pass through a series of stations before they become part of the pipeline. A length of pipe is aligned with and tack welded to an adjacent length of pipe at the first station, and finish welding is accomplished at subsequent stations in the operation. The welds are tested at another station by x-rays or the like, and if found defective, are redone at the testing station. The welded area is then cleaned, one of many forms of corrosion barrier is applied to the welded area, and the pipes advanced to the joint filling station, where the recess or cutback areas of the pipeline are covered to protect the weld and corrosion barrier from damage. This is achieved by filling the annular recess or cutback area, which varies from 16-24 inches (40.48-60.96 cm) in length by 1-6 inches (2.53-15.18 cm) in thickness, with various materials. This enables the pipeline surface to pass over the rollers at the transom of the lay barge as the pipeline is fed onto the sea or ocean floor. If the tensioned line were to snag on a roller, due to an indentation at the recess or cutback portion, the roller could be severely damaged and cause barge delay for repair. Furthermore, if the line were to surge after being snagged, it could cause a buckle which has been known to travel down the pipeline until it reaches the bottom. This can cause the loss of a mile or more of expensive pipe and add to the barge delay time. Also, if the annular recess or cutback portion is not protected, the corrosion coatings stand a high risk of being damaged, which can jeopardize the life of the entire pipeline.

Known methods in the industry for allowing the pipeline to make a smooth transition over the lay barge pipe rollers onto the sea floor, and for protecting the pipe joint from damage once the pipeline is on the sea floor involve filling the annular recess or cutback area surrounding the welded pipe joint with a quick setting material, such as a marine mastic, a polyurethane foam or different concretes. The most prevalent system or method being used today is the marine mastic method. This method comprises chopping mixed blocks of mastic (tar) and aggregate (gravel), and transporting the chopped product into a fuel fired kettle for melting. The resulting viscous material is poured into a permanent sheet metal mold banded around the annular recess or cutback area to be filled. This marine mastic method of filling the annular recess suffers from a great number of disadvantages and problems. For example, it is labor intensive requiring seven to eight men per shift. Another problem is that the method involves the use of flammable materials resulting in an increased health risk to personnel, risk of damage to the barge and an increased insurance cost. Other problems are that the marine mastic has a long set time, and is incompatible with some corrosion coatings, and especially to shrink sleeves. Another problem is that the marine mastic method involves expensive machinery. Still another problem presented by the marine mastic method is that it exposes the personnel to hazardous fumes and pollutants. Still other problems of the marine mastic method are that extra fuel for the melting kettles, and a large amount of barge space for machinery and raw materials are required. Another problem of the marine mastic method is that no inspection is possible for complete filling of the annular recess. Still another problem of the marine mastic method is that the deteriorating sheet metal molds at the bottom of the water are hazardous to nets of the local fishing industry. Also, a pipe joint recess filled with the marine mastic offers only fair impact resistance and is an expensive system.

The polyurethane foam method is gaining increased acceptance in the industry due to the fact that it is slightly less expensive than the marine mastic method and more convenient to use. The polyurethane foam method is similar to the marine mastic method, in that the two part material is mixed and injected into a permanent, banded metal mold. Disadvantages or problems presented by the polyurethane foam method are: (1) it is labor intensive (four to five men per shift), (2) large expensive equipment is required that is prone to mechanical failure (barge delay), (3) the polyurethane foam material is temperature sensitive, (4) skilled mechanics are required, (5) the polyurethane foam material is bouyant thereby reducing the weight of the pipeline, (6) the polyurethane foam has a low impact resistance, (7) deteriorating metal molds are hazardous to nets of the local fishing industries, and (8) the polyurethane foam method is an expensive method.

The recess filling method involving different concretes has met with little success in the industry. This method, involving polymer cements and quick-set concretes, has many of the above disadvantages and problems recited for the marine mastic and the polyurethane foam methods. However, the primary disadvantage or problem presented by the cement and concrete methods is that it is extremely expensive.

In light of the many problems and disadvantages inherent in and presented by the aforementioned known and described methods, an improved simple, more reliable and cost-effective method for filling the annular recess or cutback area surrounding the pipe weld joint is desparately needed. The pipe joint weld collar of this invention fulfills this need by effectively solving the aforementioned problems presented by the known methods.

SUMMARY OF THE INVENTION

In accordance with a preferred embodiment of the invention, a pipe joint weld collar and method of installation are disclosed for an offshore pipeline for covering contiguous end portions of a pair of pipes joined together by a metal weld. The pipe joint weld collar comprises:

coatings of a high specific gravity material applied to the outer periphery of the pair of pipes except for the contiguous end portions of the pipes to form a peripheral recess providing access to the pipe end portions for metal welding;

a plastic sheet spanning the recess and wrapped around the end portions of the coatings for covering the recess with the sheet end portions overlapped; and means for securing the clamped sheet on to the end portions of the coatings.

In another aspect of the invention, a method is disclosed for installing a collar on a pipe joint weld of an offshore pipeline for covering contiguous end portions of a pair of pipes joined together by a metal weld. The method comprises the steps of:

applying coatings of a high specific gravity material to the outer periphery of the pair of pipes except for the contiguous end portions of the pipes to form a peripheral annular recess providing access to the pipe end portions for metal welding;

wrapping a plastic sheet spanning the recess around the end portions of the coatings to form a collar covering the recess; and securing the clamped sheet on to the end portions of the coatings.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
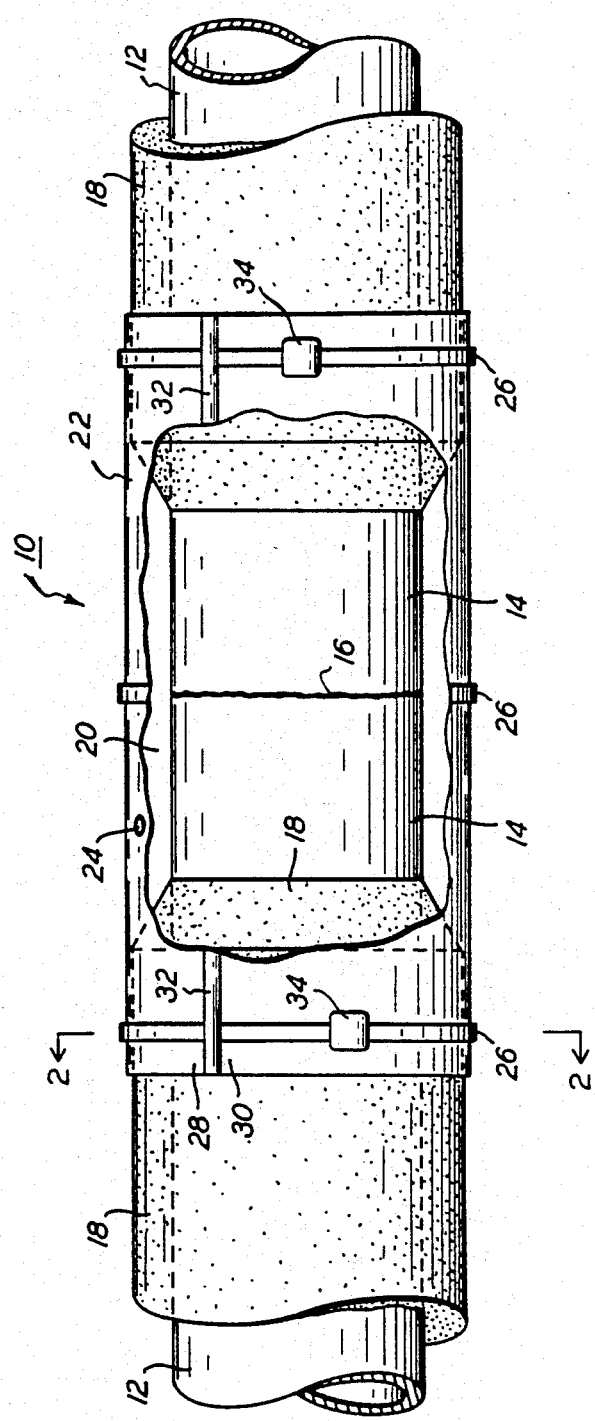
FIG. 1 is a segmental side elevation view of a preferred embodiment of the pipe joint weld collar of this invention with a portion thereof broken away.
Figure 2:
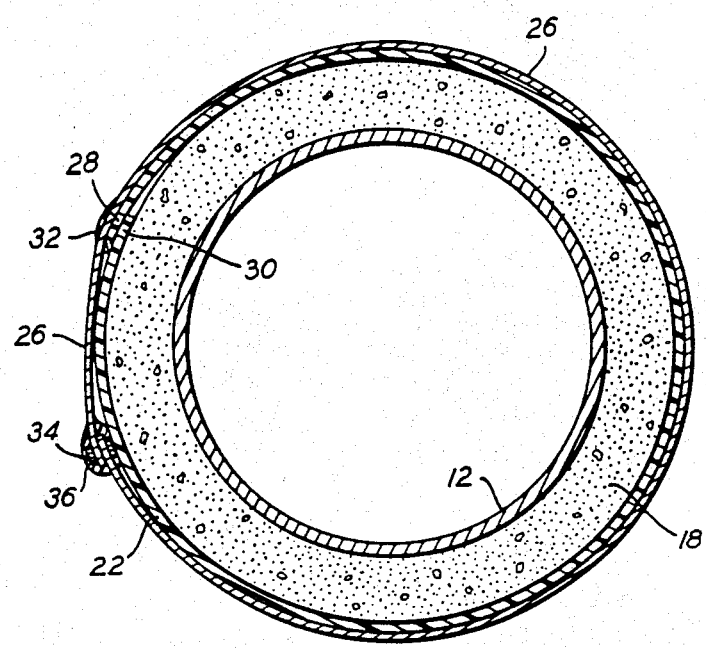
FIG. 2 is a section view taken substantially along line 2—2 of FIG. 1.
Figure 3:
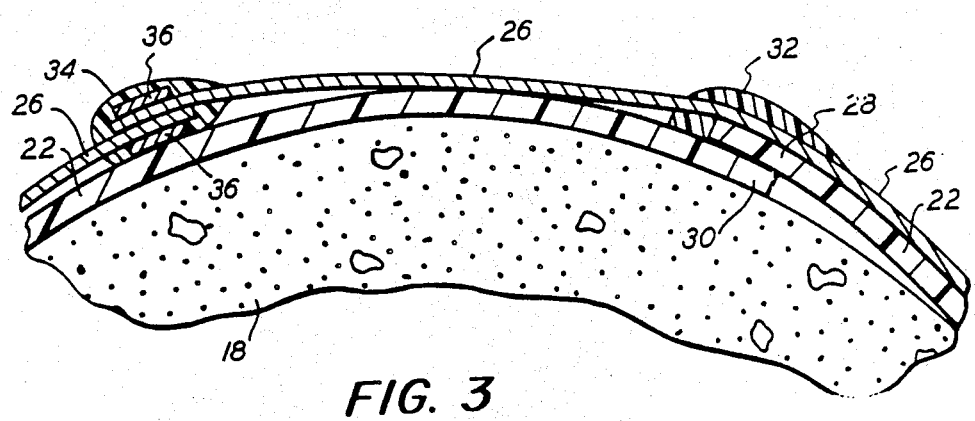
FIG. 3 is an enlarged fragmentary sectional view of a portion of FIG. 2.

Referring now to the drawings, a preferred embodiment of a pipe joint weld collar 10 and method of installation is disclosed for an offshore pipeline. The pipeline is formed from a plurality of lengths of pipe 12 having contiguous end portions 14 of each pair of pipes 12 joined together by a metal weld 16. Each of the pipes is covered by a coating 18 of a high specific gravity material, such as concrete, to hold the pipeline on the sea floor when raw materials of a density less than water are transported therethrough. To allow access to the pipe end portions 14 for welding, the concrete coatings 18 are omitted from the pipe end portions forming an annular recess 20, referred to in the industry as a cutback area. The material needed to form the pipe joint weld collar 10 comprises a sheet 22 of virgin high density polyethylene of six millimeters (plus or minus fifteen per cent) thickness. The sheet 22 is precut to a length equal to the circumference of the concrete coating 18 on the pipe plus three inches (7.62 cm), and a width equal to the length of the annular recess 20 plus 24 inches (60.96 cm). This allows the sides of the sheet to overlap the concrete coating about twelve inches (30.48 cm) on each end portion thereof, and the sheet end portions to overlap about three inches (7.62 cm) to form the pipe joint weld covering or collar 10. The sheets 22 have three small holes 24 (approximately $\frac{5}{8}$ inch) (1.59 cm) drilled preferably near the pipe weld to allow for the passage of water into the annular recess 20 below the collar 10 once the pipe 12 is submerged. The compressive strength of the water provides excellent impact protection of the collar from foreign objects. Also, three metal bands 26 hold the sheet in position for seam welding the outer sheet end portion 28 to the overlapped sheet end portion 30, as best seen in FIG. 2. The seam weld 32 is achieved by applying a bead of the same plastic material as the sheet or a compatible material to the seam by any suitable extrusion welder. Once the seam weld has been applied, the bands may be removed if desired. The bands are preferably removed after the collar has passed over the rollers and before it enters the water.

The only tools or machinery required to install the pipe joint weld covering 10 are a hand held extrusion welder, two band pullers with crimpers, a heat gun for initial tack welding, and a seam sander with backups.

The labor or manpower requirements for installation of a pipe joint weld covering 10 involve only one trained technician and two unskilled laborers.

The method for applying the collar 10 of this invention to a pipe joint weld 16 involves stopping the pipeline at a wrapping station on a lay barge with the welded pipe end portions 14 exposed. At this station, two men wrap a pre-cut sheet 22 around the cutback or annular recess 20, overlapping the concrete on each end by approximately twelve inches (30.48 cm) for covering the recess. A third man secures the pre-cut metal bands 26 around the wrapped sheet to hold the sheet end portion 28 in position for welding or crimping. The bands 26 are tightened and held by band connectors 36 so that the bands compress the sheet sufficiently so that it tightly engages the concrete to eliminate the possibility of sheet slippage. A technician tacks the seam outer sheet end portion 28 to the overlapped sheet end portion 30 with the heat gun to prevent sheet movement, and then places a weld 32 along the tacked seam with the hand held extrusion welder using extrudate material similar to the sheet material. Each of the exposed ends or clamps of the metal bands 16 are also covered with a bead 34 of the extrudate welding material to produce a one-piece, smooth, uninterrupted collar over this vulnerable area of the pipeline. The total time required to cover the pipe joint weld is approximately four minutes per joint.

The superior physical properties, such as tensile strength, density, hardness, compressive properties, dimensional stability, puncture, tear and tensile impact resistance, of the commercially available high density polyethylene sheet provide a solid, durable, lifetime protective collar 10 for the pipe joints on the ocean floor. The 6 mm thickness also provides enough rigidity so that the pipe collar may move over the barge rollers without sagging, snagging or surging.

Some direct advantages of the pipe joint weld collar 10 of this invention are: (1) a great reduction in direct material and labor costs, (2) the need for only hand held machinery rather than large, heavy, expensive, delicate machinery, (3) a dramatic reduction of manpower, (4) the need for only one sheet of material versus unstable, temperature sensitive mixed materials, (5) a great reduction in possible injury to personnel or the lay barge resulting from fires, (6) the need for minimal storage space for the flat, palletized and stacked sheets, and banding material on rolls, (7) increased resistance of the pipe joint weld collar to most environmental hazards due to the superior strength of the collar material coupled with the impact absorption of the water in the annular recess, (8) increased resistance to pipeline breakage and resulting oil spills which can gravely affect the fishing industry caused, for example, by net holding trawl boards, some of which are as large as a barn door and weigh 1,000 lbs. (453.6 kg) or more as they are drawn over the pipeline, and (9) the elimination of damage to fish nets that are drawn over the pipeline since the pipe joint or collar does not deteriorate and create sharp, net cutting edges.

The invention has been described in detail with particular reference to a preferred embodiment thereof, but it will be understood that variations and modifications can be effected within the spirit and scope of the invention.

What is claimed is:

1. A pipe joint weld collar for an offshore pipeline for covering contiguous end portions of a pair of pipes joined together by a metal weld, the combination comprising:
    coatings of a high specific gravity material applied to the outer periphery of the pair of pipes except to form a peripheral recess providing access to the pipe end portions for joining them together by the metal weld;
    a plastic sheet spanning the recess and wrapped around the end portions of the coatings with the sheet end portions overlapped to cover the recess;
    the plastic sheet having openings allowing passage of water into the recess under the plastic sheet upon submerging the pipe joint metal collar in the water; and
    means for securing the wrapped sheet onto the end portions of the coatings to form the collar.

2. A pipe joint weld collar according to claim 1 wherein the coatings comprise concrete coatings.

3. A pipe joint weld collar according to claim 1 wherein the plastic sheet comprises a high density polyethylene sheet.

4. A pipe joint weld collar according to claim 3 wherein the sheet has a thickness of 0.236 inches (6 mm).

5. A pipe joint weld collar according to claim 1 wherein the securing means comprises a plastic weld for securing one end portion of the sheet to the overlapped end portion of the sheet.

6. A pipe joint weld collar according to claim 1 and further comprising means for at least temporarily clamping the wrapped sheet onto the end portions of the coatings to prevent movement of the sheet.

7. A pipe joint weld collar according to claim 6 wherein the clamping means comprises a clamped flexible band.

8. A pipe joint weld collar according to claim 6 wherein the coatings comprise concrete coatings, wherein the plastic sheet comprises a high density polyethylene sheet having a thickness of 0.236 inches (6 mm), wherein the clamping means comprises a clamped flexible band, and wherein the securing means comprises a plastic weld for securing one end portion of the sheet to the overlapped end portion of the sheet.

9. A method for installing a collar over a pipe joint weld of an offshore pipeline having contiguous end portions of a pair of pipes joined together by a metal weld, comprising the steps of:
    applying coatings of a high specific gravity material to the outer peripheries of the pair of pipes except for the contiguous end portions of the pipes to form a peripheral recess providing access to the pipe end portions for joining them together by the metal weld;
    wrapping the side portions of a plastic sheet around the adjacent end portions of the coatings with the sheet end portions overlapped for covering the recess;
    the plastic sheet having openings allowing passage of water into the recess under the plastic sheet upon submerging the pipe joint metal collar in the water;
    clamping the sheet onto the end portions of the coatings to prevent movement of the sheet; and
    welding the overlapped sheet end portions together to form the collar.

10. A method of installing a collar over a pipe joint weld of an offshore pipeline having contiguous end portions of a pair of pipes joined together by a metal weld, comprising the steps of:
    applying coatings of concrete to the outer periphery of the pair of pipes except for the contiguous end portions of the pipes to form a peripheral recess providing access to the pipe end portions for joining them together by the metal weld;
    wrapping the side portions of a high density polyethylene sheet around the end portions of the coatings with the sheet end portions overlapped for covering the recess;
    the plastic sheet having openings allowing passage of water into the recess under the plastic sheet upon submerging the pipe joint metal collar in the water; and
    securing the wrapped sheet onto the end portions of the coatings by plastic welding one end portion of the sheet to the overlapped sheet end portion to form the collar.

11. A method of installing a collar over a pipe joint weld of an offshore pipeline for covering contiguous end portions of a pair of pipes joined together by a metal weld according to claim 10, comprising the further step of:
    clamping the wrapped sheets onto the end portions of the coatings by a plurality of spaced-apart clamp bands.

12. A method of installing a collar over a pipe joint weld of an offshore pipeline having contiguous end portions of a pair of pipes joined together by a metal weld according to claim 11, comprising the further step of:

covering the exposed ends of the clamp bands with plastic weld material to produce a smooth, uninterrupted covering on the collar.

13. A method of installing a collar over a pipe joint weld of an offshore pipeline for covering contiguous end portions of a pair of pipes joined together by a metal weld according to claim 11, comprising the further step of removing the plurality of spaced apart clamp bands after said step of securing the sheet by welding.

* * * * *